(12) United States Patent
Engebretson et al.

(10) Patent No.: US 7,028,409 B2
(45) Date of Patent: *Apr. 18, 2006

(54) METHOD FOR COMPUTATION OF DIFFERENTIAL AZIMUTH FROM SPACED-APART GRAVITY COMPONENT MEASUREMENTS

(75) Inventors: Harold J. Engebretson, Longbranch, WA (US); Brett H. Van Steenwyk, San Luis Obispo, CA (US)

(73) Assignee: Scientific Drilling International, Houston, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 10/832,425

(22) Filed: Apr. 27, 2004

(65) Prior Publication Data

US 2005/0240350 A1  Oct. 27, 2005

(51) Int. Cl.
*G01V 1/40* (2006.01)

(52) U.S. Cl. ............................................. 33/304; 702/6
(58) Field of Classification Search ................ 702/6, 702/10; 175/45; 701/220; 73/152.54, 1.79, 73/152.48; 33/204, 304, 305, 313
See application file for complete search history.

(56) References Cited

U.S. PATENT DOCUMENTS

| 4,071,959 | A | 2/1978 | Russell et al. ................ 33/312 |
|---|---|---|---|
| 4,399,692 | A | 8/1983 | Hulsing, II et al. ...... 73/152.54 |
| 4,434,654 | A | 3/1984 | Hulsing, II et al. ...... 73/152.54 |
| 4,614,040 | A | 9/1986 | Hulsing, II et al. ........... 33/312 |
| 4,672,752 | A | 6/1987 | Hulsing, II et al. ........... 33/302 |
| 4,734,860 | A | 3/1988 | Egli et al. ...................... 702/6 |
| 4,813,274 | A | 3/1989 | DePersio et al. ......... 73/152.48 |
| 5,155,916 | A | 10/1992 | Engebretson ................ 33/302 |
| 5,321,893 | A | 6/1994 | Engebretson ................ 33/304 |
| 5,435,069 | A | 7/1995 | Nicholson ..................... 33/304 |
| 5,821,414 | A * | 10/1998 | Noy et al. ................ 73/152.54 |
| 6,179,067 | B1 * | 1/2001 | Brooks ........................ 175/45 |
| 6,453,239 | B1 * | 9/2002 | Shirasaka et al. ........... 701/220 |
| 6,480,119 | B1 | 11/2002 | McElhinney ............. 340/853.8 |
| 2004/0163443 | A1 * | 8/2004 | McElhinney ................ 73/1.79 |

* cited by examiner

*Primary Examiner*—John Barlow
*Assistant Examiner*—Victor J. Taylor
(74) *Attorney, Agent, or Firm*—William W. Haefliger

(57) ABSTRACT

A method is provided for computing the differential azimuth between two sets of spaced-apart gravity component measurement devices in a borehole, employing multiple rotation angles. The method includes modeling relationships of axes as defined; forming equations relating rotation angles to outputs of gravity measuring devices; solving such equations to derive the values representative of all of the rotation angles, using measured values of the outputs from the first and second sets of gravity component measuring devices, and computing from the values of the rotation angles the differential azimuth angle between the first set and the second set of gravity measuring devices.

14 Claims, 4 Drawing Sheets

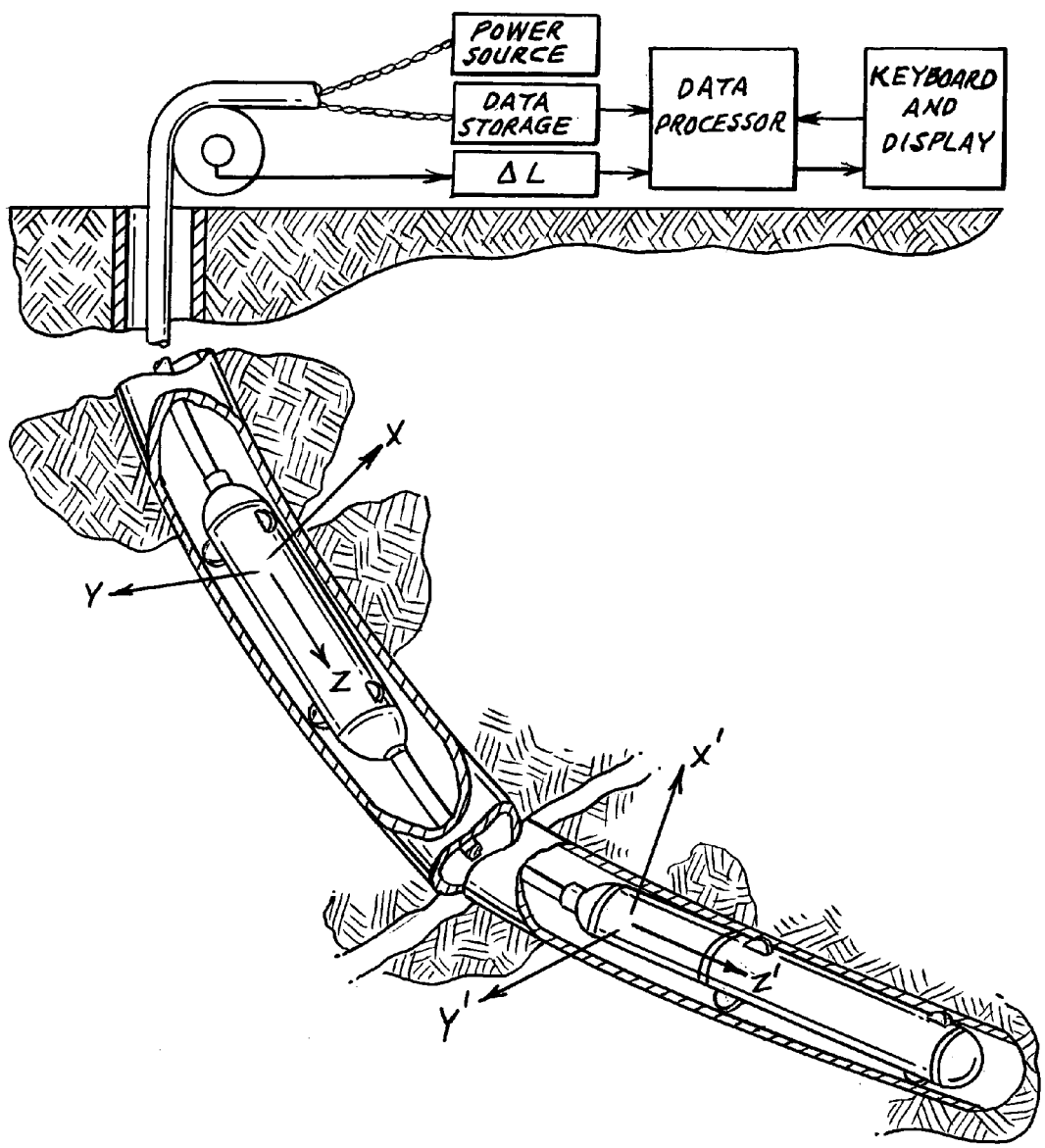

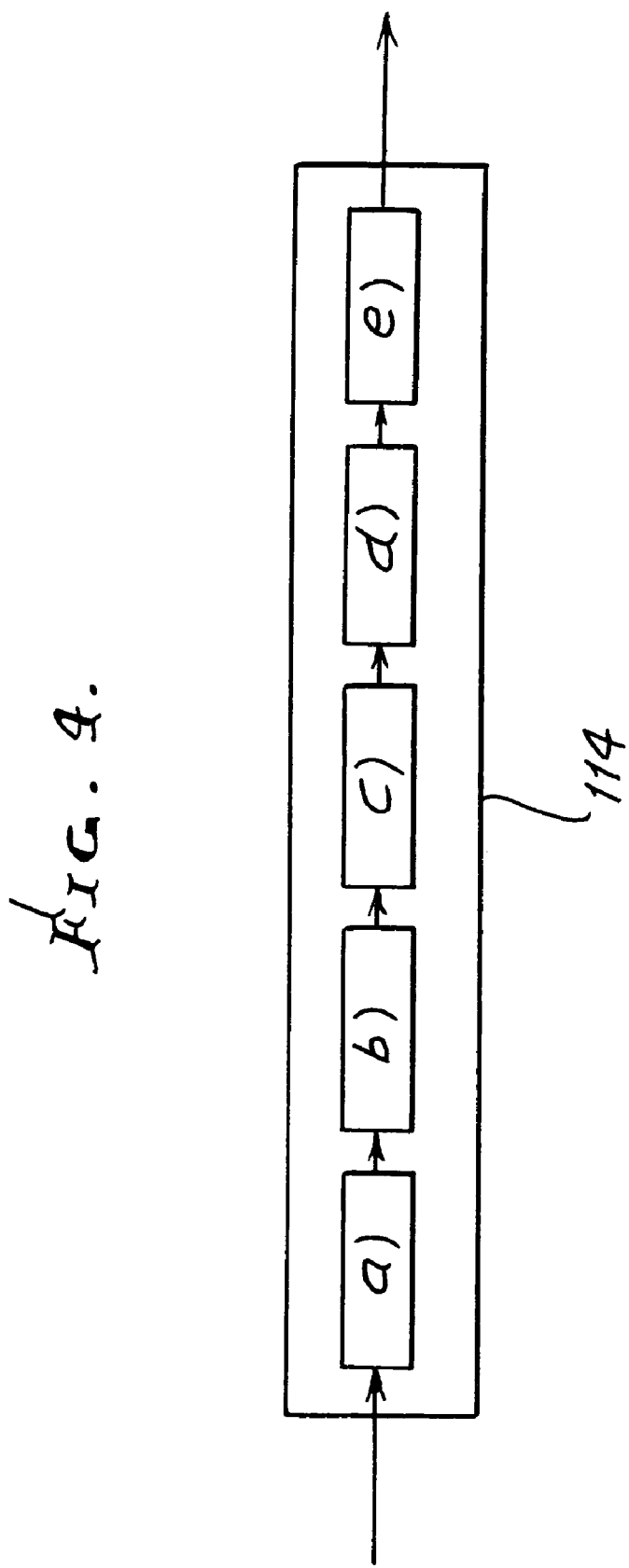

METHOD FOR COMPUTATION OF DIFFERENTIAL AZIMUTH FROM SPACED-APART GRAVITY COMPONENT MEASUREMENTS

BACKGROUND OF THE INVENTION

This invention relates to the computation of differential azimuth between two sets of spaced-apart gravity component measurement devices in a borehole, subject to the constraint that there is no rotation about the borehole axis between the two sets of measuring devices, generally known as accelerometers. Such a structure cannot determine absolute azimuth orientation but only the differential azimuth between the two spaced-apart sets of gravity component measurements. Such apparatus in general is referenced in prior art U.S. patent application Ser. No. 06/200,096, Borehole Survey Apparatus and Method, filed Oct. 23, 1980, describing one such a mechanization. That application was processed to the point of allowance of all claims and then abandoned. Another prior art example is described in U.S. Pat. No. 6,480,119, Surveying a Subterranean Borehole Using Accelerometers, issued Nov. 12, 2002. No details are there provided on the development of the equation shown therein for differential azimuth and there are issues with that equation that lead to a conclusion that acceptable results are not consistently obtainable for all possible input conditions.

It is an objective of the present invention to provide a preferred method for obtaining the above cited differential azimuth measurement that is completely described so as to teach and show the method and to provide an improved method verifiable as correct by independent analysis by users. Further, it is an objective to provide two alternative embodiments that are simpler computationally, but demonstrate less geometrical accuracy than the preferred method. These two alternatives are similarly completely described.

SUMMARY OF THE INVENTION

The invention provides a method for computing the differential azimuth between two sets of spaced-apart gravity component measurements or devices, in a borehole, subject to the constraint that there is no net rotation about the borehole axis between the two sets of gravity component measuring devices, the method comprising the steps of:

a) modeling the relationship of the sensitive axes of a first set of said gravity component measurement devices to an earth fixed coordinate set in terms of an inclination rotation angle, alpha, from the vertical and an orthogonal highside rotation angle, beta, about said borehole longitudinal axis, b) modeling the relationship of the sensitive axes of a second set of said gravity component measurement devices to said sensitive axes of said first set of gravity measurement devices in terms of a rotation angle, tau, a bend direction angle, about said borehole axis, and another rotation angle, kappa, a bend magnitude angle, about an axis that is perpendicular to said borehole axis and defined by the bend direction angle tau and a last rotation angle that is the negative of said first rotation angle tau about the said borehole axis, c) forming equations relating said rotation angles alpha, beta, tau, and kappa to the outputs of said gravity measuring devices, d) solving said equations to derive the values representative of all of said rotation angles, using measured values of said outputs from said first and second sets of gravity component measuring devices, and e) computing from said values of said rotation angles the differential azimuth angle between said first set and said second set of gravity measuring devices.

An alternative method includes the steps:

a) modeling the relationship of the sensitive axes of a first set of said gravity component measurement devices to an earth fixed coordinate set in terms of an inclination rotation angle, alpha, from the vertical and an orthogonal highside rotation angle, beta, about said borehole longitudinal axis, b) modeling the relationship of the sensitive axes of a second set of said gravity component measurement devices to said sensitive axes of said first set of gravity measurement devices in terms of a rotation angle, gamma, about an axis perpendicular to said borehole axis and another rotation angle, delta, about another axis that is perpendicular to said borehole axis and also perpendicular to other axis, c) forming equations relating said rotation angles alpha, beta, gamma and delta to the outputs of said gravity measuring devices, d) solving said equations to derive values representative of all of said rotation angles, using measured values of said outputs from said first and second sets of gravity component measuring devices, and e) computing from said values of said rotation angles the differential azimuth angle between said first set and said second sets of gravity measuring devices.

A first alternative embodiment is shown that is computationally simpler but has certain geometrical errors for larger bend angles. These geometrical errors have a well defined characteristic and corrections may be computed for some applications.

A second alternative embodiment is also shown that is even simpler computationally than either of the first two embodiments. This alternative has geometric errors comparable to those of the first alternative embodiment but the errors do not have a well defined characteristic and are not suitable to computed corrections.

Another object is to provide computational materials for use in the method of the invention.

Another object is to provide in either of such methods for inclusion of the first set of gravity measurement devices with a measure-while-drilling (MWD) apparatus in a drill string, and said second set of said gravity component measurement devices is located near the bit of said drill string, and the said computed differential azimuth angle between said first and second gravity component measuring devices is added to the azimuth data from said MWD apparatus to determine the total azimuth angle at the location of said second set near the bit.

A further object is to derive bending in the drill string between the MWD apparatus and the drill bit from the described total azimuth angle.

DRAWING DESCRIPTION

FIG. 3 shows prior apparatus.

FIG. 4 is a block diagram.

DETAILED DESCRIPTION

Figure 1:
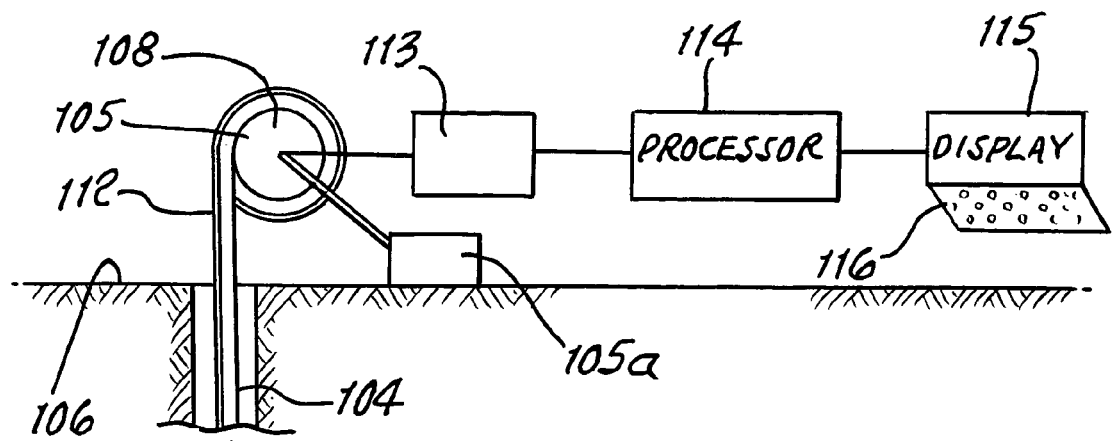
FIG. 1 shows apparatus for accurately deriving differential azimuth, according to the invention.

U.S. patent application Ser. No. 06/200,096, "Borehole Survey Apparatus and Method", filed Oct. 23, 1980 discloses a concept of using two sets of accelerometers spaced apart some distance along the borehole axis as by intervening structure. The structures between the two sets of accelerometers is flexible to follow changes in direction of the borehole about axes normal to the borehole but is torsionally rigid about the borehole axis, so that there is no change in the relative orientation of the two sets about the borehole axis.

A description of the azimuth angle computation is found in that application between page 9, line 29 and page 21, line 25. This long section describes the mechanization used to determine inclination and azimuth differences from the sensed gravity components from the two spaced-apart sets of accelerometers. The method is described in much more detail.

The following description is found in that patent (there appear to be some typographical problems in the U.S. patent, as issued, between the claims and the text).

"With respect to the present invention, the reference point can be taken at the surface or at any point on the measurement line. By way of example we will consider the reference to be from the surface. From the reference point the known azimuth of the borehole is considered to be the azimuth of the long axis (the z-axis) of one of the sets of accelerometers which are positioned at the same location as the reference, i.e., the top set. By so considering then the x, y plane and the z axis pole of the top set of accelerometers now have a fixed spatial orientation. If the lower set of accelerometers also had the same orientation then it would give the same sensor outputs, and no change in either inclination or direction would be seen between the two sets."

Now, with reference to FIG. 3, consider what happens if the lower accelerometer set 20 changes direction by an amount shown as 'delta-azimuth' in FIG. 3. If the lower accelerometer set 20 had complete freedom with respect to the upper set 30 then it could still produce the same output values and the azimuth change would not be detectable. However, since the two respective accelerometer sets are joined by a structure 10 which allows only bending and not rotation along the long axis, such as a tube, then the lower accelerometer set's x, y plane cannot change dip direction without a change in some of the x, y and z accelerometer values of the set.

The method of determining the change in azimuth of the lower accelerometer set 20, and hence of the borehole, is given by the following relationships.

First, the borehole inclination (Inc1) at the position of the upper accelerometer set 30 must be found. This is given by:

$$\text{Inc1}=\text{arc tan}((\sqrt{(Gx1^2+Gy1^2)})/Gz1) \qquad \text{Equation 1}$$

Next, the borehole inclination (Inc2) at the position of the lower accelerometer set 20 must found. Inc2 is given by:

$$\text{Inc2}=\text{arc tan}((\sqrt{(Gx2^2+Gy2^2)})/Gz1) \qquad \text{Equation 2}$$

An intermediate value beta is then found equal to:

$$Beta = \frac{\arctan\{(Gx2 * Gy1 - Gy2 * Gx1) * \sqrt{(Gx1 * Gy1 * Gz1)}\}}{\{Gz2(Gx1^2 + Gy1^2) + Gz1(Gx2 * Gx1 + Gy2 * Gy1)\}} \qquad \text{Equation 3}$$

And having found the above values, the borehole azimuth at the lower accelerometer set 20 can be found by Borehole Azimuth at position of 20=Reference Azimuth+(Beta/(1−Sin(((Inc(1)+Inc(2))/2))))    Equation 4

Having now established the Azimuth and Inclination at the position of the lower accelerometer set (hereafter referred to as position 2), the spatial co-ordinates of the borehole between the position of the upper accelerometer set (hereafter referred to as position 1) and position 2 can be calculated using standard practices e.g. Minimum Curvature calculations. If the top set is moved to a new position between positions 1 and 2 or at position 2 then the new position 1's azimuth becomes the reference Azimuth and the procedure detailed above can be repeated. Note: In Equation 3 the term $\sqrt{(Gx1*Gy1*Gz1)}$ is shown as $\sqrt{(gx1*gy1*gz1)}$ in the patent and application. Since no definition is shown for the lower case g's, then it is assumed that the upper case is intended. The form with the capital letter notation also is shown in a corresponding PCT application. Also, some of the $\sqrt{}$ signs are missing in the patent specification but are included in the claims. No definition is shown for the "intermediate value beta." Equation 3 is believed to be in error. Those skilled in the arts will recognize at least three problem areas:

1. For an arc tan function, the operand should be dimensionless. In Equation 3 whatever units are used, the result is not dimensionless. This objection could be removed if all of the accelerometer measurements are assumed to be normalized to a local one g field and thus equivalent to direction cosines relating the accelerometer input axes to the local vertical gravity vector.

2. The factor in Equation 3 of gx1*gy1*gz1 is shown in the claim as having a square root. This is believed to be the desired form since the application presented it that way and PCT publication WO 00/11316 which is a corresponding PCT application shows that form. If so, then as the tool rotates about the borehole z axis, either gx1 or gy1 could become negative making the square root a negative number.

3. The same gx1*gy1*gz1 factor can become zero whenever the x or y axis is horizontal in the number 1 position. This would lead to the value of Beta being zero, independent of the value of any measurements at the number two position.

Further, in Equation 4 the term (1−Sin(((Inc(1)+Inc(2))/2)))) is an unusual form to find in an angular-relation problem. It is not unknown. The coversed sine (coversine A=(1−sin A)) is related to the versed sine (ver sine A=(1−cos A)). This later form was used in celestial navigation in the form of the half versed sine (haversin A=½(1−Cos A) in what was called the cosine-haversine formula for computing the elevation of a star above the horizon. It is alleged that this formula was better in the use of logarithm tables and such were published for navigation use.

The mechanizations that follow overcome the problems of the cited prior art. If one considers the Gx1, Gy1 and Gx2, Gy2 pairs to be orthogonal components of the cross-borehole component of the earth's gravity vector, the term Gx2*Gy1−Gy2*Gx1 can be recognized as the cross-product of the two cross-borehole vectors and proportional to the sine of the angle between them. The term Gx2*Gx1+Gy2*Gy1 can be recognized as the dot-product of the two cross-borehole vectors and proportional to the cosine of the angle between them. The arc tan of the ratio of these two quantities would provide the difference in highside angle between the two sets of measurements. The term $Gx1^2 + Gy1^2$ can be recognized as the square of the magnitude of the cross-borehole vector at position 1. No geometrical significance can be seen in the factor $\sqrt{(Gx1*Gy1*Gz1)}$.

Current Invention

PREFEREED EMBODIMENT

Since the method of this invention determines only changes in the azimuth orientation of a borehole between two spaced-apart locations along the borehole, the initial azimuth angle may be considered as zero. This simplifies the equations below without any loss in the general usefulness of the method.

Given an X,Y,Z earth fixed coordinate set having X horizontal at any arbitrary, assumed zero, azimuth angle with respect to north, Y horizontal and normal to X and Z down and given an $x_1,y_1,z_1$ borehole fixed coordinate set for a first set of gravity component measurement devices related to X,Y,Z by rotations:
  Alpha, $\alpha$, about Y which is a tilt or inclination angle
  Beta, $\beta$, about the new Z' axis which is a gravity highside angle The $x_1,y_1,z_1$ coordinate set is related to the X,Y,Z coordinate set by the direction cosine matrix $C_1$ whose elements are:

$C_1(x_1,X)=\text{Cos}(\alpha)\text{Cos}(\beta)$ $C_1(x_1,Y)=\text{Sin}(\beta)$ $C_1(x_1,Z)=-\text{Sin}(\alpha)\text{Cos}(\beta)$ $C_1(y_1,X)=-\text{Cos}(\alpha)\text{Sin}(\beta)$ $C_1(y_1,Y)=\text{Cos}(\beta)$ $C_1(y_1,Z)=\text{Sin}(\alpha)\text{Sin}(\beta)$ $C_1(z_1,X)=\text{Sin}(\alpha)$ $C_1(z_1,Y)=0$ $C_1(z_1,Z)=\text{Cos}(\alpha)$ And given another $x_2,y_2,z_2$ borehole fixed coordinate set for a second set of gravity component measurement devices related to the prior $x_1,y_1,z_1$ borehole fixed set by rotations:
  Tau, $\tau$, about the z1 axis which is a bend direction angle of the drill string
  Kappa, $\kappa$, about the new $x_1'$ axis which is a bend magnitude angle of the drill string orthogonal to tau
  –Tau, $-\tau$, about the new $z_1''$ axis, such rotation being the negative of the rotation tau above The $x_2,y_2,z_2$ coordinate set is related to the $x_1,y_1,z_1$ coordinate set by the direction cosine matrix $C_2$ whose elements are:

$C_2(x_2, x_1)=\text{Cos}(\kappa)+(1-\text{Cos}(\kappa))\text{Cos}^2(\tau)$ $C_2(x_2, y_1)=(1-\text{Cos}(\kappa))\text{Sin}(\tau)\text{Cos}(\tau)$ $C_2(x_2, z1)=-\text{Sin}(\tau)\text{Sin}(\kappa)$ $C_2(y_2, x_1)=(1-\text{Cos}(\kappa))\text{Sin}(\tau)\text{Cos}(\tau)$ $C_2(y_2, y_1)=\text{Cos}(\kappa)+(1-\text{Cos}(\kappa))\text{Sin}^2(\tau)$ $C_2(y_2, z_1)=\text{Cos}(\tau)\text{Sin}(\kappa)$ $C_2(z_2, x_1)=\text{Sin}(\tau)\text{Sin}(\kappa)$ $C_2(z_2, y_1)=-\text{Cos}(\tau)\text{Sin}(\kappa)$ $C_2(z_2, z_1)=\text{Cos}(\kappa)$ The sequence of rotation, tau, kappa, –tau, was chosen to represent a rotation sequence of a drill string such that there was no rotation about the z axis between the $x_1,y_1,z_1$ set of axes and the $x_2,y_2,z_2$ set of axes and that the net rotation angle of the drill string was represented by kappa. For a direction cosine matrix such as $C_2$ which represents a rotation of a set of coordinates, it may be shown that the z-axis component of the net rotation is given by $C_2(y_2,x_1)-C_2(x_2,y_1)$ which can be seen to be zero for the values shown above. Further for such a direction cosine matrix, $C_2$, it may be shown that cosine of the total rotation angle, in this case the intended kappa, is given by:

Rotation Angle=arc $\cos(Tr(C_2)-1)/2)$ where $Tr(C_2)$, the trace of the matrix is given by $C_2(x_2,x_1)+C_2(y_2,y_1)+C_2(z_2,z_1)$.

Using this relation, the Rotation Angle becomes the arc $\cos(\text{Cos}(\kappa))$ which is just kappa, $\kappa$, as desired.

Given these relationships, consider two orthogonal sets of accelerometers, spaced apart along the z axis. The bend direction angle tau and the bend magnitude angle kappa represent the rotations of the lower set with respect to the upper set. There is no rotation about the borehole z axis between the two measurement sets since they are connected by a structure which is torsionally rigid about the borehole axis. Consider the upper set as Set 1 and the lower set as Set 2.

For Set 1, the inclination angle is alpha and the highside angle is beta. Consider the magnitude of gravity to be one unit. The three gravity components of Set 1 then are:

$G_{x1}=-\text{Sin}(\alpha)\text{Cos}(\beta)$ $G_{y1}=\text{Sin}(\alpha)\text{Sin}(\beta)$ $G_{z1}=\text{Cos}(\alpha)$ From these, one may compute $\alpha$ and $\beta$ as:

$\alpha=\text{arc tan}((\sqrt{G_{x1}^2+G_{y1}^2})/G_{z1})$ and $\beta=\text{arc tan}(G_{y1}/-G_{x1})$ For Set 2, the gravity components are measured. Their values can be expressed in terms of a second set of rotations, equivalent to alpha and beta for Set 1 and a tilt or inclination value, $\alpha_2$, and a gravity highside angle, $\beta_2$, can be computed from the measurements. What is needed to solve for a change in azimuth angle between Set 1 and Set 2 is the direction cosine matrix $C_3$ which relates the $x_2,y_2,z_2$ coordinate set to the original starting coordinate set X,Y,Z.

The direction cosine matrix $C_3$ is by definition equal to the matrix product of the matrix $C_1$ times $C_2$ so since the matrix $C_1$ is known from the Set 1 accelerometer measurements the problem becomes that of finding the matrix $C_2$ from the Set 1 and Set 2 gravity component measurements.

The gravity components of $G_2$ for Set 2 are related to the gravity components $G_1$ for Set 1 by the matrix relationship:

$[G_2]=C_2[G_1]$ where $[G_2]$ has three components $Gx_2, Gy_2$ and $Gz_2$, $C_2$ is the direction cosine matrix defined above relating the $x_2,y_2,z_2$ coordinate set and $[G_1]$ has three components $G_{x1}, G_{y1}$, and $G_{z1}$.

The problem is, given the measurements $[G_1]$, $[G_2]$, and the form of $C_2$ in terms of the defined angles tau and kappa, solve for numerical values of tau and kappa.

From these, the required values in the matrix $C_2$ can be found and then the required values from the matrix $C_3$ can be found.

For convenience, define the vector $[d_1]$ as equal to $[G_1]$ and $[d_2]$ as equal to $[G_2]$.

Further define the vector $[n_1]$ as equal to its three components $[C_1(x_1,X),C_1(y_1,X],C_1[z_1,X]$ and further define the vector $[e_1]$ as equal to its components $[C_1(x_1,Y),C_1(y_1,Y),C_1(z_1,Y)]$. Thus the vectors $[n_1]$, $[e_1]$ and $[d_1]$ are just the X, Y and Z axes of the original starting point coordinates expressed in the $x_1,y_1,z_1$ coordinate set.

The vector dot product $[d_1] \cdot [d_2]$, or equivalently $[G] \cdot [G_2]$, the gravity measurement vectors, is equivalent to $[d_1] \cdot [C_2$ $[d_1]$. Since the form of $C_2$ is known in terms of the angles tau and kappa the following equations related to $[d_1]\cdot[d_2]$ can be written using alpha, beta, tau and kappa as defined above. The values for alpha and beta are known from the Set 1 measurements and tau and kappa are the unknowns for which a solution is desired.

$$[d_1]\cdot[d_2]=[d_1]\cdot[C_2[d_1]]=\text{Cos}(\kappa)+(1-\text{Cos}(\kappa))\text{Sin}^2(\alpha)\text{Cos}^2(\beta+\tau)$$

from which $$\text{Cos}(\kappa)=([d_1]\cdot[d_2]-\text{Sin}^2(\alpha)\text{Cos}^2(\beta+\tau))/(1-\text{Sin}^2(\alpha)\text{Cos}^2(\beta+\tau))$$

Similarly, $$[n_1]\cdot[d_2]=[n_1]\cdot[C_2[d_1]] \text{ and } [e_1]\cdot[d_2]=[e_1]\cdot[C_2[d_1]]$$

Thus, $$[n_1]\cdot[d_2]=(1-\text{Cos}(\kappa))\text{Sin}(\alpha)\text{Cos}(\beta+\tau)\{-\text{Cos}(\alpha)\text{Cos}(\beta+\tau)\}-\text{Sin}(\kappa)\text{Sin}(\beta+\tau)$$

$$[e_1]\cdot[d_2]=-(1-\text{Cos}(\kappa))\text{Sin}(\alpha)\text{Cos}(\beta+\tau)\{\text{Sin}(\beta+\tau)\}-\text{Sin}(\kappa)\text{Cos}(\alpha)\text{Cos}(\beta+\tau)$$

To simplify this, define $$p=-\text{Cos}(\alpha)\text{Cos}(\beta+\tau) \text{ and } q=\text{Sin}(\beta+\tau)$$

then $$[n_1]\cdot[d_2]=(1-\text{Cos}(\kappa))\text{Sin}(\alpha)\text{Cos}(\beta+\tau)p-(\text{Sin}(\kappa))q$$

and $$[e_1]\cdot[d_2]=-(1-\text{Cos}(\kappa))\text{Sin}(\alpha)\text{Cos}(\beta+\tau)q-(\text{Sin}(\kappa))p$$

since $$p^2+q^2=1-(1-\text{Sin}^2(\alpha)\text{Cos}^2(\beta+\tau))$$

then $$([n_1]\cdot[d_2])q+([e_1]\cdot[d_2])p=-(\text{Sin}(\kappa))(p^2+q^2)$$

and $$\text{Sin}(\kappa)=-(([n_1]\cdot[d_2])q+([e_1]\cdot[d_2])p)/((1-\text{Sin}^2(\alpha)\text{Cos}^2(\beta+\tau))$$

From $\text{Sin}(\kappa)$ and $\text{Cos}(\kappa)$ the value of kappa, $\kappa$, can be computed.

A similar treatment could be used to find a term including tau by eliminating all terms in kappa from the above equations. However, a simpler solution is found by substituting for both $\text{Sin}(\kappa)$ and $\text{Cos}(\kappa)$ into the equation for $[n_1]\cdot[d_2]$ shown above. These substitutions result in an equation such that $$([n_1]\cdot[d_2])p-([e_1]\cdot[d_2])q=(1-[d_1]\cdot[d_2])\text{Sin}(\alpha)\text{Cos}(\beta+\tau))$$

Using the definitions $w_n=([n_1]\cdot[d_2])$, $w_e=([e_1]\cdot[d_2])$ and $w_d=[_1]\cdot[d_2]$ and expanding out the equations for p and q shown above, the result is $$w_e\text{Sin}(\beta+\tau)=[\text{Cos}(\alpha)w_n+(1-w_d)\text{Sin}(\alpha)]\text{Cos}(\beta+\tau)$$

For this equation to be true, the coefficient of $\text{Sin}(\beta+\tau)$ must be proportional to $\text{Cos}(\beta+\tau)$ and vice versa:

$$\text{Sin}(\beta+\tau)=K[\text{Cos}(\alpha)w_n+(1-w_d)\text{Sin}(\alpha)]$$

$$\text{Cos}(\beta+\tau)=-K\,w_e$$

where K is some proportionality constant. From these relations, since $\alpha$ and $\beta$ are known from the Set 1 measurements one can solve for $\tau$ and then given this result, $\kappa$ can be found using the equations above for $\text{Sin}(\kappa)$ and $\text{Cos}(\kappa)$. Since K can be positive or negative, there is an ambiguity as to the proper value for $\tau$. From physical reasoning, the value of $\tau$ that results in the smallest $\kappa$ should be chosen. Alternatively, returning to the equation shown above:

$$w_e\text{Sin}(\beta+\tau)=[\text{Cos}(\alpha)w_n+(1-w_d)\text{Sin}(\alpha)]\text{Cos}(\beta+\tau)$$

This can be rewritten as:

$$A\,\text{Cos}(\beta+\tau)+B\,\text{Sin}(\beta+\tau)=0$$

which after dividing through by $A^2+B^2$ is equivalent to $$\text{Sin}(\theta+\beta+\tau)=0$$

where $\theta=\arctan(A/B)$ and thus $\tau=-(\theta+\beta)$ and again their may be an ambiguity since $\text{Sin}(180)=\text{Sin}(0)$. The alternative expression should be $\tau=180-(\theta+\beta)$. As before, the value of tau that leads to the smallest kappa should be used. Having found values for kappa and tau using the measured data from the Set 1 and Set 2 accelerometers, the values for the nine elements of the direction cosine matrix $C_2$ may be computed. From this, and from the values for the direction cosine matrix C, determined from values for alpha and beta derived from the Set 1 accelerometer measurements, the matrix product:

$$C_3=C_2C_1$$

may be found. From the direction cosine matrix $C_3$, a result for the azimuth orientation of the Set 2 measurements may be found. Note that by definition, the azimuth direction of a borehole is the horizontal projection of the along-borehole z axis onto the horizontal plane defined by the X,Y, vectors cited above. Given the values for the direction cosine matrix $C_3$, the azimuth angle change, $\Delta\Psi$, from Set 1 to Set 2 is then found as:

$$\Delta\Psi=\arctan(C_3(z_2,Y)/C_3(z_2,X))$$

If $\Delta\Psi$ is added to some initial azimuth angle for Set 1, then the result is the total azimuth angle for Set 2.

FIRST ALTERNATIVE EMBODIMENT

Given an X,Y,Z earth fixed coordinate set having X at any arbitrary angle with respect to north, Y normal to X and Z down and given an x,y,z borehole fixed coordinate set for a first set of gravity component measurement devices related to X,Y,Z by rotations:

Alpha, $\alpha$, about Y which is a tilt angle
Beta, $\beta$, about the new Z' axis which is a highside angle And given another x,y,z borehole fixed coordinate set for a second set of gravity component measurement devices related to the prior x,y,z borehole fixed set by rotations:

Gamma, $\gamma$ about the new Y" axis which is a bend angle of the drill string
Delta, $\delta$, about the new X'" axis which is a bend angle of the drill string orthogonal to gamma This last x,y,z coordinate set is related to the X,Y,Z coordinate set by a nine-element direction cosine matrix. The elements of that matrix are:

$C(x,X) = -\text{Sin}(\alpha)\text{Sin}(\gamma) + \text{Cos}(\alpha)\text{Cos}(\beta)\text{Cos}(\gamma)$ $C(x,Y) = \text{Sin}(\beta)\text{Cos}(\gamma)$ $C(x,Z) = -(\text{Cos}(\alpha)\text{Sin}(\gamma) + \text{Sin}(\alpha)\text{Cos}(\beta)\text{Cos}(\gamma))$ $C(y,X) = \text{Sin}(\delta)(\text{Sin}(\alpha)\text{Cos}(\gamma) + \text{Cos}(\alpha)\text{Cos}(\beta)\text{Sin}(\gamma)) - \text{Cos}(\alpha)\text{Sin}(\beta)\text{Cos}(\delta)$ $C(y,Y) = \text{Cos}(\beta)\text{Cos}(\delta) + \text{Sin}(\beta)\text{Sin}(\gamma)\text{Sin}(\delta)$ $C(y,Z) = \text{Sin}(\alpha)\text{Sin}(\beta)\text{Cos}(\delta) + \text{Sin}(\delta)(\text{Cos}(\alpha)\text{Cos}(\gamma) - \text{Sin}(\alpha)\text{Cos}(\beta)\text{Sin}(\gamma))$ $C(z,X) = \text{Cos}(\alpha)\text{Sin}(\beta)\text{Sin}(\delta) + \text{Cos}(\delta)(\text{Sin}(\alpha)\text{Cos}(\gamma) + \text{Cos}(\alpha)\text{Cos}(\beta)\text{Sin}(\gamma))$ $C(z,Y) = \text{Sin}(\beta)\text{Sin}(\gamma)\text{Cos}(\delta) - \text{Cos}(\beta)\text{Sin}(\delta)$ $C(z,Z) = \text{Cos}(\delta)(\text{Cos}(\alpha)\text{Cos}(\gamma) - \text{Sin}(\alpha)\text{Cos}(\beta)\text{Sin}(\gamma)) - \text{Sin}(\alpha)\text{Sin}(\beta)\text{Sin}(\delta)$ Given these relationships, consider two orthogonal sets of accelerometers, spaced apart along the z axis. The bend angles gamma and delta represent the rotations of the lower set with respect to the upper set. There is no rotation about the borehole z axis between the two measurement sets since they are connected by a structure which is torsionally rigid about the borehole axis. Consider the upper set as Set 1 and the lower set as Set 2.

For Set 1, gamma and delta are both zero. The inclination angle is alpha and the highside angle is beta. Consider the magnitude of gravity to be one unit. The three gravity components of Set 1 then are:

$G_{x1} = -\text{Sin}(\alpha)\text{Cos}(\beta)$ $G_{y1} = \text{Sin}(\alpha)\text{Sin}(\beta)$ $G_{z1} = \text{Cos}(\alpha)$ From these, one may compute $\alpha$ and $\beta$ as:

$\alpha = \text{arc tan}((\sqrt{G_{x1}^2 + G_{y1}^2})/G_{z1})$ and $\beta = \text{arc tan}(G_{y1}/-G_{x1})$ For Set 2, substituting the above gravity components for the like indicated relations:

$G_{x2} = -(G_{z1}\text{Sin}(\gamma) - G_{x1}\text{Cos}(\gamma))$ $G_{y2} = G_{y1}\text{Cos}(\delta) + (G_{x1}\text{Cos}(\gamma) - G_{x1}\text{Sin}(\gamma))\text{Sin}(\delta)$ $G_{z2} = (G_{z1}\text{Cos}(\gamma) + G_{x1}\text{Sin}(\gamma))\text{Cos}(\delta) - G_{y1}\text{Sin}(\delta)$ The immediate problem is, given the two sets of gravity measurements, what are the values of gamma and delta from the last three equations above. Since there are really only two variables, gamma and delta, and there are three equations in this second set a solution is available.

The first equation is recognized as equivalent in form to Equation 401.2 in "Tables of Integrals and Other Mathematical Data," Herbert Bristol Dwight, The Macmillan Company, New York, N.Y., 1955. That equation is:

$p \text{ Cos } A + q \text{ Sin } A = r \text{ Sin}(A + \theta)$ where $r = \sqrt{(p^2 + q^2)} \text{ Sin } \theta = p/r \text{ Cos } \theta = q/r$ Thus the equation:

$G_{x2} = -(G_{z1}\text{Sin}(\gamma) - G_{x1}\text{Cos}(\gamma))$ may be equated to the form above wherein $p = G_{x1}$, $q = -G_{z1}$, from which $r = \sqrt{(G_{x1}^2 + G_{z1}^2)}$ and $\theta = \text{arc tan}(G_{x1}/-G_{z1})$ This leads to:

$\gamma = \text{arc sin}(G_{x2}/\sqrt{(G_{x1}^2 + G_{z1}^2)}) - \text{arc tan}(G_{x1}/-G_{z1})$ Since some computer languages do not include an arc sin routine, this expression can be shown as a arc tan function:

$\gamma = \text{arc tan}(G_{x2}/\sqrt{(G_{x1}^2 + G_{z1}^2 - G_{x2}^2)}) - \text{arc tan}(G_{x1}/-G_{z1})$ Some care is required in choosing the sign for the square-root function shown. The simplest approach is to compute a value of delta with both a positive and with a negative value for the square root. The smallest value will be the one desired.

Similarly in the equation:

$G_{y2} = G_{y1}\text{Cos}(\delta) + (G_{z1}\text{Cos}(\gamma) + G_{x1}\text{Sin}(\gamma))\text{Sin}(\delta)$ the form $(G_{z1}\text{Cos}(\gamma) + G_{x1}\text{Sin}(\gamma))$ may be assigned a value $G_c$ which may be computed since all of the elements $G_{z1}$, $G_{x1}$ and $\gamma$ are known. Thus this equation can be put in the form above wherein $p = G_{y1}$, $q = G_c$, $r = \sqrt{(G_{y1}^2 + G_c^2)}$ and $\theta = \text{arc tan}(G_{y1}/G_c)$.

Using these then the equation may be solved as:

$\delta = \text{arc sin}(G_{y2}/\sqrt{(G_{y1}^2 + G_c^2)}) - \text{arc tan}(G_{y1}/G_c)$ Since some computer languages do not include an arc sin routine, this expression can be shown as an arc tan function:

$\delta = \text{arc tan}(G_{y2}/\sqrt{(G_{y1}^2 + G_c^2 - G_{y2}^2)}) - \text{arc tan}(G_{y1}/G_c)$ Some care is required in choosing the sign for the square-root function shown. The simplest approach is to compute a value of delta with both a positive and with a negative value for the square root. The smallest value will be the one desired.

This completes the solution. However for a check on the value of $\delta$ the third equation above:

$G_{z2} = (G_{z1}\text{Cos}(\gamma) + G_{x1}\text{Sin}(\gamma))\text{Cos}(\delta) - G_{y1}\text{Sin}(\delta)$ may be solved as above. Note that $G_c$ is the same as above. Now $p = G_c$, $q = -G_{y1}$, $r = \sqrt{(G_{y1}^2 + G_c^2)}$ and $\theta = \text{arc tan}(G_c/-G_{y1})$.

Using these then:

$\delta = \text{arc sin}(G_{z2}/\sqrt{(G_{y1}^2 + G_c^2)}) - \text{arc tan}(G_c/-G_{y1})$ Since some computer languages do not include an arc sin routine, this expression can be shown as a arc tan function:

$\delta = \text{arc tan}(G_{z2}/\sqrt{(G_{y1}^2 + G_c^2 - G_{z2}^2)}) - \text{arc tan}(G_{y1}/-G_c)$ Again, some care is required in choosing the sign for the square-root function. Given now $\alpha$, $\beta$, $\gamma$ and $\delta$ the direction cosines $C(z,X)$ and $C(z,Y)$ may be computed as:

$C(z,X) = \text{Cos}(\alpha)\text{Sin}(\beta)\text{Sin}(\delta) + \text{Cos}(\delta)(\text{Sin}(\alpha)\text{Cos}(\gamma) + \text{Cos}(\alpha)\text{Cos}(\beta)\text{Sin}(\gamma))$ $C(z,Y) = \text{Sin}(\beta)\text{Sin}(\gamma)\text{Cos}(\delta) - \text{Cos}(\beta)\text{Sin}(\delta)$ The azimuth angle change, $\Delta\Psi$, from Set 1 to Set 2 is then found as:

$$\Delta\Psi = \text{arc tan}(C(z,Y)/C(z,X))$$

If $\Delta\Psi$ is added to some initial azimuth angle for Set 1, then the result is the total azimuth angle for Set 2.

SECOND ALTERNATIVE EMBODIMENT

An approximate solution to the problem described above is found from U.S. Pat. No. 4,071,959, Gyro Stabilized Single-Axis Platform, at Column 3, Line 5, to Column 5, Line 51. This patent provides the basis for the Sperry Sun B.O.S.S. survey tool. That tool has a single set of accelerometers mounted on a gyro stabilized single axis platform having its stabilization axis along the borehole. As the tool travels along the borehole, it follows the bends of the borehole but is, in effect, torsionally rigid about the borehole axis. Thus subsequent sets of accelerometer measurements are equivalent to the mode described above. This solution is based on the small-angle assumption for which the sine of the angle is the angle and the cosine of the angle is one.

Equation E of the patent shows the solution as:

$$\Delta\Psi = -(1/\cos\Theta))\Delta\Phi_2$$

where $\Delta\Psi$ is the change in azimuth between the two sets of data $\Theta$ is the inclination angle $\Delta\Phi_2$ is the change in high side angle between the two sets of data Placed in the context of the notations shown at the beginning of this paper this is equivalent to:

$$\Delta\Psi = -(1/\cos(\alpha))\text{arc tan}((G_{y1}G_{x2} - G_{y2}G_{x1})/(G_{x1}G_{x2} + G_{y1}G_{y2}))$$

Error Consideration

Simple physical reasoning shows that none of the embodiments cited above produce a useful result if the borehole is in an initially horizontal plane and the angular bends are in that plane. This is simply the consequence of the fact that the output of a set of accelerometers is invariant for a rotation about the gravity vector, the nominally vertical direction. Beyond this limitation, there may/are also be geometrical errors due to the mechanization and as a practical matter accelerometer errors that will cause errors in the gravity component measurements. Such accelerometer errors are not discussed in detail but it is apparent that their effect will be largest for a nominally vertical starting orientation of the borehole.

Detailed error analyses of the geometrical errors in the above methods show that for the preferred embodiment, geometrical errors are zero except for the exception for horizontal boreholes cited above. These same analyses show that the geometrical errors for the first alternative embodiment increase as the magnitude of the bend angle between the two sets of measurements increases. Errors are quite small for bend angles of less than about two degrees but increase to a significant level above this value. However, the errors have a definitive pattern and may be shown to be proportional to Sin $\alpha$ Sin $\beta$. As such, it is possible to compute a correction that will reduce the error but not eliminate the error.

Further, these error analyses show that the second alternative embodiment has errors comparable to the first alternative embodiment but that the errors do not show a definitive pattern that would suggest correction by computation.

Attempts to analyze the errors in the mechanization shown in U.S. Pat. No. 6,480,119 all failed due to the requirement for the square root of a negative number, namely the product of $G_{x1}$ $G_{y1}$ $G_{z1}$.

It is recognized that in the treatment above, the sequence of the rotations for the first alternative embodiment, gamma and delta, can be reversed without altering the basic concept of the invention. All that is required is to rewrite the equations for solution using the selected order for these rotations.

Applications

The methods of the embodiments shown above can be used for the complete survey of a borehole, given a means to initialize the process to some known azimuth. Such a survey tool eliminates the use of magnetometers or gyroscopes which would reduce the cost, and possibly the size of the survey tool Another method of use would be to provide the upper set of accelerometers as elements of a conventional Measure-While-Drilling (MWD) apparatus. This MWD apparatus would provide an azimuth reference that could be used with the differential azimuath determination from the lower set of accelerometers to obtain the correct total azimuth for the lower set of accelerometers. In a typical drilling procedure, a mud motor or other motor means is often used between the MWD apparatus and a drill bit at the bottom end of the drill string. This often results in a substantial distance along the borehole between the MWD apparatus and the drill bit, leading to some uncertainty with respect to the inclination and azimuth orientation at the bit and in turn uncertainty in the future path of the drill string. Using the methods described above, a second lower set of accelerometers could be installed near the bit and both inclination and azimuth at the bit could be determined.

In all of the embodiments described above, it has been assumed that three orthogonal gravity components are available for the computations described. Since the earth's gravity field is a known constant for any location the required three orthogonal gravity components can be obtained either by a set of three accelerometers or by a set of two orthogonal accelerometers and a third component derived by computation, knowing the two measured components and the know value of the gravity field.

Referring now to FIG. 1, it shows an upper housing 100, a lower housing 101, and a connector 102 connecting 100 and 101. This equipment is suspended by a line or cable 104, in a borehole 103, in the earth. The line travels to a cable winding device 105 at the surface 106, and a power source 105a is connected to 105 to controllably rotate it, for raising and lowering the equipment 100, 101, and 102, in the borehole as during a survey. An idler 108 turns the cable.

Within 100 is an upper or first set 110 of gravity component measurement devices, as for example three sensitive axis accelerometers, and within 101 is a lower or second set 111 of gravity component measurement devices, as for example accelerometers. Accelerometer sets, generally, are disclosed in Engebretson U.S. Pat. Nos. 5,155,916 and 5,321,893. The accelerometer outputs at both sets are transmitted as via suitable wiring 112 along the cable or line, and to processing circuitry that may include a data recorder 114, and processor 114 for calculating in accordance with the above disclosure. A suitable display 115 and/or keyboard 116 may be connected to 114, for displaying data, or processed data, in accordance with the outputs, including $\psi$, or ΔΨ, referred to above, in accordance with the computations referred to, as may be carried out in the processor 114.

Connector 102 is typically such that no net relative rotation occurs as between 110 and 111, abut the borehole axis 103*a*, during operation. Borehole engaging guides 120 and 121 on 100 and 101, act to guide 100 and 101 as they move along the borehole, and also to center 100 and 101 in the hole. Guides 120 and 121 may assist in preventing such net relative rotation, as by slipping on the borehole surface. The units 100 and 101 may incorporate suitable power surfaces, if needed. Wiring 112 may provide for up-down control and transmission as between 116 and the equipments 110 and 111.

Figure 1A:
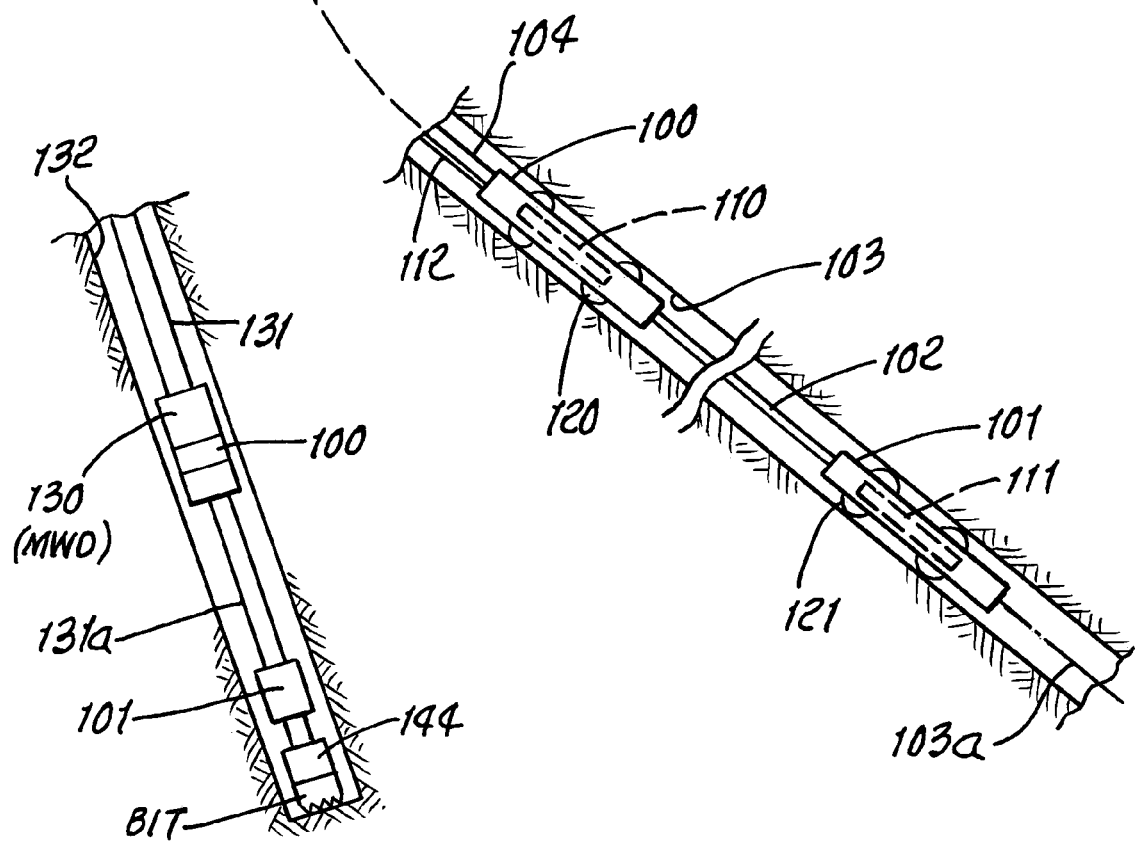
FIG. 1a shows FIG. 1 type apparatus in an MWD environment.
Figure 2:
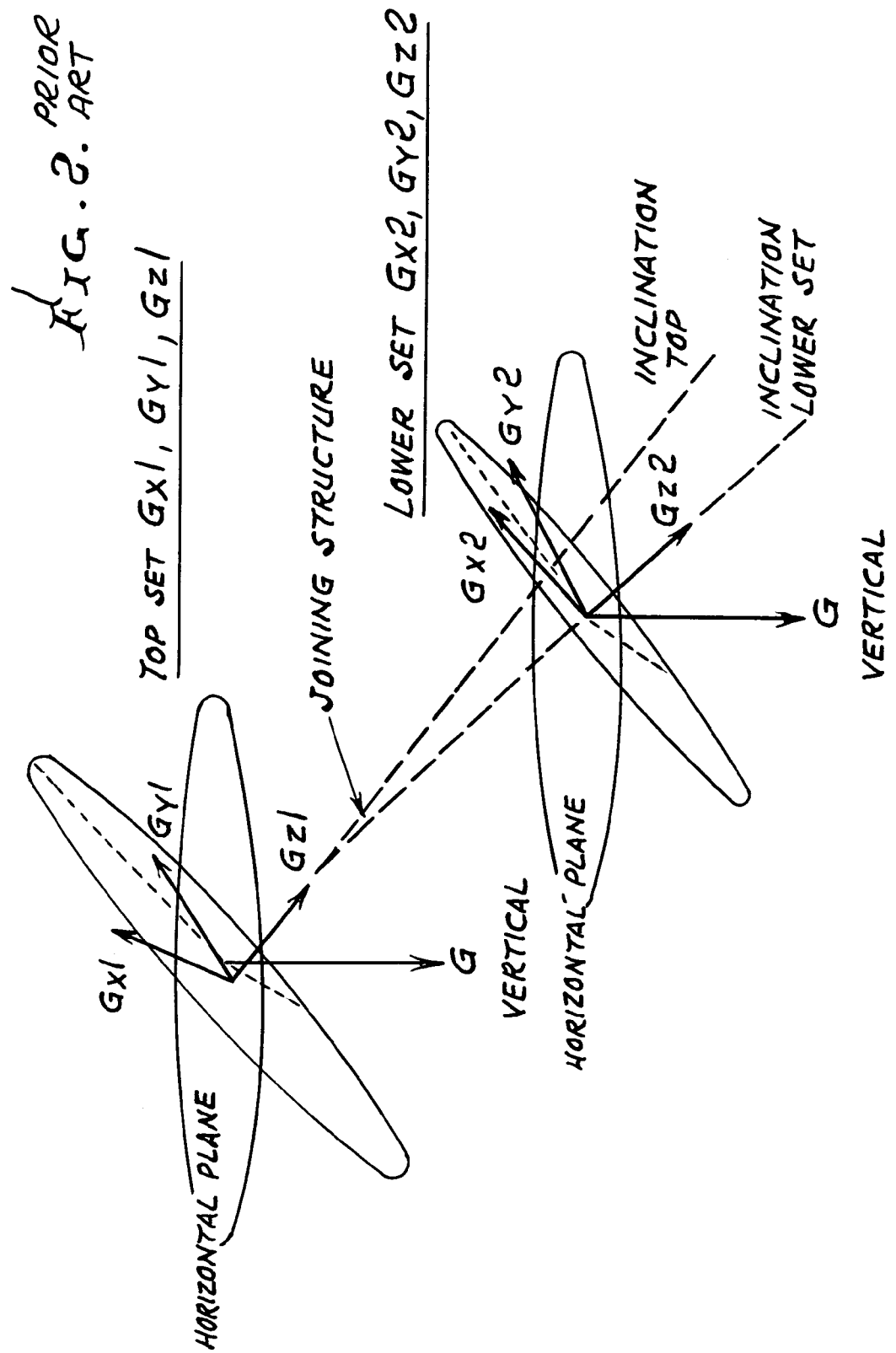
FIG. 2 illustrates two sets of gravity component measurement devices, in a borehole.

FIG. 1*a* shows the housing 100 associated with or carried by an MWD apparatus 130, on a drill stem 131, in a wellbore 132, and housing 101 associated with or carried by a bit box 144 at the lower end of the stem 131. A section 131*a* of stem 131 extends between 100 and 101, and prevents relative rotation as between 100 and 101, as when rotary drilling is interrupted, but the stem being moved axially, to allow measurements. Data from 110 and 111 in 100 and 101 may be transmitted to or processed at the surface or via suitable wiring associated with stem 131, or by other known transmission, for example.

Bending in the drill string between the MWD apparatus and the drill bit is derived during computation of said total azimuth angle.

FIG. 4 is a block diagram showing steps of the basic method, including the following:

a) modeling the relationship of the sensitive axes of a first set of said gravity component measurement devices to an earth fixed coordinate set in terms of an inclination rotation angle, alpha, from the vertical and an orthogonal highside rotation angle, beta, about said borehole longitudinal axis, b) modeling the relationship of the sensitive axes of a second set of said gravity component measurement devices to said sensitive axes of said first set of gravity measurement devices in terms of a rotation angle, tau, a bend direction angle, about said borehole axis, and another rotation angle, kappa, a bend magnitude angle, about an axis that is perpendicular to said borehole axis and defined by the bend direction angle tau and a last rotation angle that is the negative of said first rotation angle tau about the said borehole axis, c) forming equations relating said rotation angles alpha, beta, tau, and kappa to the outputs of said gravity measuring devices, d) solving said equations to derive the values representative of all of said rotation angles, using measured values of said outputs from said first and second sets of gravity component measuring devices, and e) computing from said values of said rotation angles the direction cosines of the borehole axis of said second sets of gravity component measurement devices to an assumed initial reference set of horizontal axes and from said direction cosines computing the differential azimuth angle between said first set and said second sets of gravity measuring devices.

We claim:

1. A method for computing the differential azimuth between two sets of spaced-apart gravity component measurement devices in a borehole, subject to the constraint that there is no net rotation about the borehole axis between the two sets of gravity component measuring devices having outputs, comprising the steps of:

a) modeling the relationship of the sensitive axes of a first set of said gravity component measurement devices to an earth fixed coordinate set in terms of an inclination rotation angle, alpha, from the vertical and an orthogonal highside rotation angle, beta, about said borehole longitudinal axis, b) modeling the relationship of the sensitive axes of a second set of said gravity component measurement devices to said sensitive axes of said first set of gravity measurement devices in terms of a rotation angle, tau, a bend direction angle, about said borehole axis, and another rotation angle, kappa, a bend magnitude angle, about an axis that is perpendicular to said borehole axis and defined by the bend direction angle tau and a last rotation angle that is the negative of said first rotation angle tau about the said borehole axis, c) forming equations relating said rotation angles alpha, beta, gamma and delta to the outputs of said gravity measuring devices, d) solving said equations to derive the values representative of all of said rotation angles, using measured values of said outputs from said first and second sets of gravity component measuring devices, and e) computing from said values of said rotation angles the direction cosines of the borehole axis of said second set of gravity component measurement devices to an assumed initial reference set of horizontal axes and from said direction cosines computing the differential azimuth angle between said first set and said second sets of gravity measuring devices.

2. A method for computing the differential azimuth between two sets of spaced-apart gravity component measurement devices in a borehole, subject to the constraint that there is no net rotation about the borehole axis between the two sets of gravity component measuring devices having outputs, comprising the steps of:

a) modeling the relationship of the sensitive axes of a first set of said gravity component measurement devices to an earth fixed coordinate set in terms of an inclination rotation angle, alpha, from the vertical and an orthogonal highside rotation angle, beta, about said borehole longitudinal axis, b) modeling the relationship of the sensitive axes of a second set of said gravity component measurement devices to said sensitive axes of said first set of gravity measurement devices in terms of a rotation angle, gamma, about an axis perpendicular to said borehole axis and another rotation angle, delta, about another axis that is perpendicular to said borehole axis and also perpendicular to other axis, c) forming equations relating said rotation angles alpha, beta, gamma and delta to the outputs of said gravity measuring devices, d) solving said equations to derive values representative of all of said rotation angles, using measured values of said outputs from said first and second sets of gravity component measuring devices, and e) computing from said values of said rotation angles the direction cosines of the borehole axis of said second set of gravity component measurement devices to an assumed initial reference set of horizontal axes and from said direction cosines computing the differential azimuth angle between said first set and said second sets of gravity measuring devices.

3. The method of claim 1 wherein said first set of said gravity component measurement devices is included with a measure-while-drilling (MWD) apparatus in a drill string, and said second set of said gravity component measurement devices is located near the bit of said drill string, and the said computed differential azimuth angle between said first and second gravity component measuring devices is added to the azimuth data from said MWD apparatus to determine the total azimuth angle at the location of said second set near the bit.

4. The method of claim 2 wherein said first set of said gravity component measurement devices is included with a measure-while-drilling (MWD) apparatus in a drill string, and said second set of said gravity component measurement devices is located near the bit of said drill string, and the said computed differential azimuth angle between said first and second gravity component measuring devices is added to the azimuth data from said MWD apparatus to determine the total azimuth angle at the location of said second set near the bit.

5. A method for computing the differential azimuth between two sets of spaced-apart gravity component measurement devices in a borehole, subject to the constraint that there is no net rotation about the borehole axis between the two sets of gravity component measuring devices having outputs, comprising the steps of:
   a) obtaining values, for an inclination rotation angle $\alpha$ from the vertical, and an orthogonal highside rotation angle $\beta$ about the longitudinal axis of the borehole, as related to the sensitive axes of a first set of said devices and an earth fixed coordinate set,
   b) obtaining values for a rotation angle tau, a bend direction angle about the borehole axis, and another rotation angle kappa, a bend magnitude angle about an axis that is perpendicular to the borehole axis, and a last rotation angle that is the negative of tau, as related to the sensitive axes. of a second set of said devices,
   c) deriving values representative of all of said rotation angles, using measured values of said outputs from said first and second sets of gravity component measuring devices,
   d) and deriving from said last named values the differential azimuth angle between said first set and said second set of gravity measuring devices.

6. A method for computing the differential azimuth between two sets of spaced-apart gravity component measurement devices in a borehole, subject to the constraint that there is no rotation about the borehole axis between the two sets of gravity component measuring devices having outputs comprising the steps of:
   a) obtaining values for an inclination rotation angle $\alpha$ from the vertical, and an orthogonal highside rotation angle $\beta$ about the longitudinal axis of the borehole, as related to the sensitive axes of a first set of said devices and an earth fixed coordinate set,
   b) obtaining values for a rotation angle $\gamma$ about an axis perpendicular to the borehole axis, and another rotation angle $\Delta$ about another axis that is perpendicular to the borehole axis and also perpendicular to said other axis,
   c) deriving values representative of all of said rotation angles, using measured values of said outputs from said first and second sets of gravity component measuring devices,
   d) and deriving from said last named values of said rotation angles the different azimuth angle between said first set and said second sets of gravity measuring devices.

7. The method of claim 5 wherein said first set of said gravity component measurement devices is included with a measure-while-drilling (MWD) apparatus in a drill string, and said second set of said gravity component measurement devices is located near the bit of said drill string, and the said computed differential azimuth angle between said first and second gravity component measuring devices is added to the azimuth data from said MWD apparatus to determine the total azimuth angle at the location of said second set near the bit.

8. The method of claim 6 wherein said first set of said gravity component measurement devices is included with a measure-while-drilling (MWD) apparatus in a drill string, and said second set of said gravity component measurement devices is located near the bit of said drill string, and the said computed differential azimuth angle between said first and second gravity component measuring devices is added to the azimuth data from said MWD apparatus to determine the total azimuth angle at the location of said second set near the bit.

9. The method of claim 5 wherein said first set of said gravity component measurement devices is part of a measure-while-drilling (MWD) apparatus in a drill string in the borehole and said second set of said gravity component measurement devices is located in the drill string near the bit of said drill string.

10. The method of claim 9 wherein the said derived differential azimuth angle between said first and second gravity component sensing devices is added to azimuth data derived from said MWD apparatus to determine the total azimuth angle at the location of said second set near the said bit.

11. The method of claim 10 wherein bending in the drill string between the MWD apparatus and the drill bit is derived from said total azimuth angle.

12. The method of claim 5 wherein said differential azimuth angle between said sets of devices is further utilized to determine drill string bending between said devices.

13. A method for computing the differential azimuth between two sets of spaced-apart gravity component measurement devices in a borehole, subject to the constraint that there is no net rotation about the borehole axis between the two sets of gravity component measuring devices having outputs, comprising the steps of:
   a) modeling the relationship of the sensitive axes of a first set of said gravity component measurement devices to an earth fixed coordinate set in terms of an inclination rotation angle, alpha, from the vertical and an orthogonal highside rotation angle, beta, about said borehole longitudinal axis,
   b) modeling the relationship of the sensitive axes of a second set of said gravity component measurement devices to said sensitive axes of said first set of gravity measurement devices in terms of a rotation angle, tau, a bend direction angle, about said borehole axis, and another rotation angle, kappa, a bend magnitude angle, about an axis that is perpendicular to said borehole axis and defined by the bend direction angle tau and a last rotation angle that is the negative of said first rotation angle tau about the said borehole axis,
   c) forming equations relating said rotation angles alpha, beta, tau, and kappa to the outputs of said gravity measuring devices,
   d) solving said equations to derive the values representative of all of said rotation angles, using measured values of said outputs from said first and second sets of gravity component measuring devices, and
   e) computing from said values of said rotation angles the differential azimuth angle between said first set and said second set of gravity measuring devices, f) the method further characterized in that the $x_1, y_1, z_1$ coordinate set is related to the earth fixed coordinate set X, Y, Z by the direction cosine matrix $C_1$ whose elements are $$C_1(x_1,X) = \cos(\alpha)\cos(\beta)$$

$$C_1(x_1,Y) = \sin(\beta)$$

$$C_1(x_1,Z) = -\sin(\alpha)\cos(\beta)$$

$$C_1(y_1,X) = -\cos(\alpha)\sin(\beta)$$

$$C_1(y_1,Y) = \cos(\beta)$$

$$C_1(y_1,Z) = \sin(\alpha)\sin(\beta)$$

$$C_1(z_1,X) = \sin(\alpha)$$

$$C_1(z_1,Y) = 0$$

$$C_1(z_1,Z) = \cos(\alpha)$$

where
- $x_1, y_1, z_1$ is a borehole fixed coordinate set for a first set of gravity component measurement devices,
- alpha, $\alpha$, about Y, is a tilt or inclination angle,
- beta, $\beta$, about the new Z' axis, is a gravity highside angle.

14. The method of claim 2 wherein said differential azimuth $\Delta\Psi$ is the value arctan C(z,Y)/C) (z,X) where:

$$C(z,Y) = \sin(\alpha)\sin(\gamma)\cos(\delta) - \cos(\beta)\sin(\beta)$$

and $$C(z,X) = \cos(\alpha)\sin(\beta)\sin(\delta) + \cos(\delta)(\sin(\alpha)\cos(\beta) + \cos(\alpha)\cos(\beta)\sin(\gamma))$$

where:
- $\alpha$ = alpha in claim 2
- $\beta$ = beta in claim 2
- $\gamma$ = gamma in claim 2
- $\delta$ = delta in claim 2.

* * * * *

UNITED STATES PATENT AND TRADEMARK OFFICE
CERTIFICATE OF CORRECTION

PATENT NO. : 7,028,409 B2 Page 1 of 1
APPLICATION NO. : 10/832425
DATED : April 18, 2006
INVENTOR(S) : Harold J. Engebretson and Brett H. Van Steenwyk It is certified that error appears in the above-identified patent and that said Letters Patent is hereby corrected as shown below:

Column 5, line 57, "was no rotation about the zaxis between the $x_1$, $y_1$. $z_1$ set of"

should read --was no rotation about the $z_1$ axis between the $x_1$, $y_1$. $z_1$ set of--

Column 8, line 27, "matrix C, determined from values from alpha and beta derived"

should read --matrix $C_1$ determined from values for alpha and beta derived--

Column 18, line 9, "$C(z,Y) = \sin(\alpha) \sin(\gamma) \cos(\delta) - \cos(\beta) \sin(\beta)$"

should read --$C(z,Y) = \sin(\beta) \sin(\gamma) \cos(\delta) - \cos(\beta) \sin(\beta)$ --

Column 18, lines 12-13
"$C(z,X) = \cos(\alpha) \sin(\beta) \sin(\delta) + \cos(\delta)(\sin(\alpha) \cos(\beta) + \cos(\alpha) \cos(\beta) \sin(\gamma))$".

should read -- $C(z,X) = \cos(\alpha) \sin(\beta) \sin(\delta) + \cos(\delta)(\sin(\alpha) \cos(\alpha) + \cos(\alpha) \cos(\beta) \sin(\gamma))$--

Signed and Sealed this

Twenty-second Day of August, 2006

JON W. DUDAS
*Director of the United States Patent and Trademark Office*